(12) United States Patent
Islam et al.

(10) Patent No.: US 10,512,061 B2
(45) Date of Patent: Dec. 17, 2019

(54) BANDWIDTH AGNOSTIC TONE MAPPING

(71) Applicant: QUALCOMM Incorporated, San Diego, CA (US)

(72) Inventors: Muhammad Nazmul Islam, Edison, NJ (US); Tao Luo, San Diego, CA (US); Juergen Cezanne, Ocean Township, NJ (US); Bilal Sadiq, Basking Ridge, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/481,437

(22) Filed: Apr. 6, 2017

(65) Prior Publication Data

US 2017/0318559 A1 Nov. 2, 2017

Related U.S. Application Data

(60) Provisional application No. 62/337,206, filed on May 16, 2016, provisional application No. 62/329,045, filed on Apr. 28, 2016.

(51) Int. Cl.
*H04W 72/00* (2009.01)
*H04L 5/00* (2006.01)
*H04W 72/04* (2009.01)
*H04W 72/08* (2009.01)

(52) U.S. Cl.
CPC ......... *H04W 72/005* (2013.01); *H04L 5/0048* (2013.01); *H04W 72/0453* (2013.01); *H04W 72/085* (2013.01)

(58) Field of Classification Search
CPC .. H04L 5/0048; H04L 5/0044; H04W 72/005; H04W 72/0453; H04W 72/085
See application file for complete search history.

(56) References Cited

U.S. PATENT DOCUMENTS

| 2010/0014603 A1* | 1/2010 | Palanki ................... H04L 5/023 375/260 |
| 2013/0250793 A1* | 9/2013 | Bhattad ............... H04L 25/0202 370/252 |
| 2014/0301353 A1 | 10/2014 | Frenne et al. |

(Continued)

FOREIGN PATENT DOCUMENTS

WO WO-2017131806 A1 * 8/2017 ........... H04B 7/0617

OTHER PUBLICATIONS

International Search Report and Written Opinion—PCT/US2017/026521—ISA/EPO—dated Jul. 13, 2017.

(Continued)

*Primary Examiner* — Benjamin H Elliott, IV
(74) *Attorney, Agent, or Firm* — Patterson & Sheridan, LLP

(57) ABSTRACT

Disclosed in this application are techniques to enabling and employing bandwidth agnostic tone mapping. Certain aspects of the present disclosure relate to methods and apparatus for mapping coded bits of a broadcast channel to tones of a symbol. Certain aspects of the present disclosure relate to methods and apparatus for mapping bits of a beamformed reference signal (BRS) signal to tones of a symbol. Other aspects, embodiments, and features are also claimed and described.

23 Claims, 11 Drawing Sheets

(56) References Cited

U.S. PATENT DOCUMENTS

| | | | |
|---|---|---|---|
| 2014/0364117 A1 | 12/2014 | Montojo et al. | |
| 2015/0085793 A1* | 3/2015 | Luo | H04L 5/0048 370/329 |
| 2015/0215146 A1 | 7/2015 | Zhang et al. | |
| 2015/0373668 A1 | 12/2015 | Lee et al. | |
| 2016/0135058 A1 | 5/2016 | Chen et al. | |
| 2016/0345347 A1* | 11/2016 | Cheng | H04L 5/001 |
| 2017/0208588 A1* | 7/2017 | Park | H04L 7/00 |

OTHER PUBLICATIONS

Samsung., "Radio link problem detection in mmW systems," 3GPP Draft; R2-162445 Radio Link Problem Detection in MMW Systems, 3rd Generation Partnership Project (3GPP), Mobile Competence Centre; 650, Route Des Lucioles ; F-06921 Sophia-Antipolis Cedex; France, vol. RAN WG2, No. Dubrovnik, Croatia; 20160411-2016041, Apr. 1, 2016 (Apr. 1, 2016), XP051082120, pp. 3 pages. Retrieved from the Internet: URL:http://www.3gpp.org/ftp/tsg_ran/WG2_RL2/TSGR2 93bis/Docs/[retrieved on Apr. 1, 2016].

Siemens., "E-UTRA BCH Structure and Procedures, 20 MHz BW Mapping," 3GPP Draft; R1-062743, 3rd Generation Partnership Project (3GPP), Mobile Competence Centre ; 650, Route Des Lucioles ; F-06921 Sophia-Antipolis Cedex; France, vol. RAN WG1, No. Seoul. Korea; Oct. 4, 2006, Oct. 4, 2006 (Oct. 4, 2006), XP050103231, pp. 6 pages.

* cited by examiner

Beams in 1st Symbol

Beams in Nth Symbol

BANDWIDTH AGNOSTIC TONE MAPPING

PRIORITY CLAIM

The present Application for Patent claims benefit of and priority to U.S. Provisional Patent Application Ser. No. 62/329,045, filed Apr. 28, 2016, and U.S. Provisional Patent Application Ser. No. 62/337,206, filed May 16, 2016. Both of these applications are assigned to the assignee hereof, Qualcomm Incorporated, and hereby expressly incorporated by reference herein as if fully set forth below and for all applicable purposes.

TECHNICAL FIELD

The technology discussed below generally relates to wireless communications and, more particularly, to techniques for mapping coded bits of a broadcast channel to tones in a subframe. Embodiments and aspects of the technology can enable and provide improved synchronization between components for wireless communication in a variety of network communication types, including mmWave systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Cellular networks generally utilized synchronized efforts to enable communication. For example, in order for a terminal (or user equipment) to communicate with a base station in a cell (e.g., the coverage area of a base station), the terminal needs to be synchronized with the timing of the cell and also have certain system information. In some scenarios, networks use a broadcast channel to accomplish synchronized communication. Accordingly, embodiments and techniques described below enable generating synchronization signals to synchronize terminals with the cell timing and to generating and transmitting broadcast channels.

Certain aspects of the present disclosure provide a method for wireless communication by a base station. The method generally includes mapping coded bits of at least one of a physical broadcast channel (PBCH) or a beamformed reference signal (BRS) to tones of a symbol of a subframe. Some of the coded bits can be mapped to a same set of tones independent of system bandwidth and transmitting the at least one of the PBCH or BRS in the symbol according to the mapping.

Certain aspects of the present disclosure provide a method for wireless communication by a user equipment (UE). The method generally includes determining a mapping of coded bits of at least one of a physical broadcast channel (PBCH) or a beamformed reference signal (BRS) to tones of a symbol of a subframe. Some of the coded bits may be mapped to a same set of tones independent of system bandwidth and monitoring for the at least one of the PBCH or BRS in the symbol according to the mapping.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
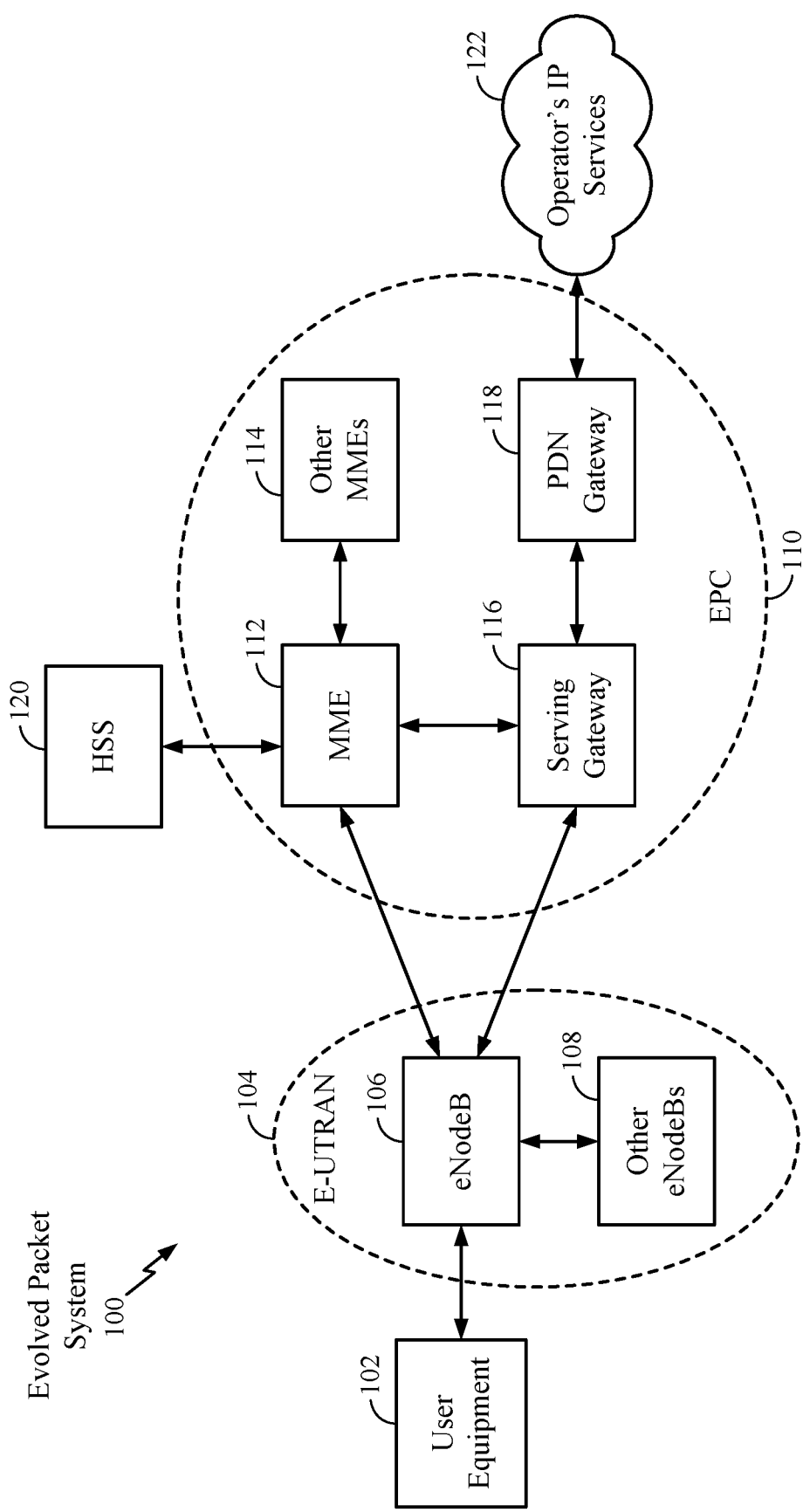
FIG. 1 is a diagram illustrating an example of a network architecture according to some embodiments.

According to aspects of the present disclosure, techniques are provided for mapping coded bits of a broadcast channel to tones in symbols of a subframe. In some cases, the mapping may be considered agnostic to system bandwidth. This advantageously can enable a receiving device to determine the tone locations regardless of the particular actual system bandwidth (which may not yet be known). In certain scenarios, wireless communication components (e.g., receiving devices, UEs, or terminals) can generate sequences for reference signals helping ability to decode certain channel measurements. This can aid to improve synchronization between communication components for follow-on wireless communication.

As will be described in greater detail below, a similar type of mapping may be applied to map a sequence of bits for a beam reference signal (BRS) to tones in a symbol. BRS may be transmitted in different directions, allowing a UE to provide feedback regarding a preferred direction. In some cases, BRS transmissions may be swept across different directions across symbols—or even within the same symbol.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an example network architecture 100 in which aspects of the present disclosure may be practiced. While components of the network architecture may correspond to an LTE network architecture, aspects of the present disclosure may be utilized in other types of existing or future network architectures, such as mmWave network architectures used in 5G or so called new radio (NR) applications.

NR generally refers to a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation Referring back to the example network architecture 100 of FIG. 1, a base station (BS) (e.g., eNB 106) selects an ESS sequence, applies a cyclic shift to the ESS sequence in the frequency domain based on the selected sequence and a symbol index in which the selected ESS sequence is to be transmitted. Further, the BS transmits the ESS sequence in a symbol corresponding to the symbol index to a UE (e.g., UE 102).

A first core network (CN) (e.g., EPC 110) associated with a first RAT (e.g., 4G or 5G), for example, receives first data from a first BS (e.g., eNB 106) associated with the first RAT, the first data received at the first BS from a UE (e.g., UE 102). The CN receives second data from a second CN (not shown) associated with a second RAT, the second RAT received at a second BS from the UE and communicated to the second CN by the second BS. The CN then aggregates the first and the second data.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set, an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, medical device, entertainment device, wearable, implantable device, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
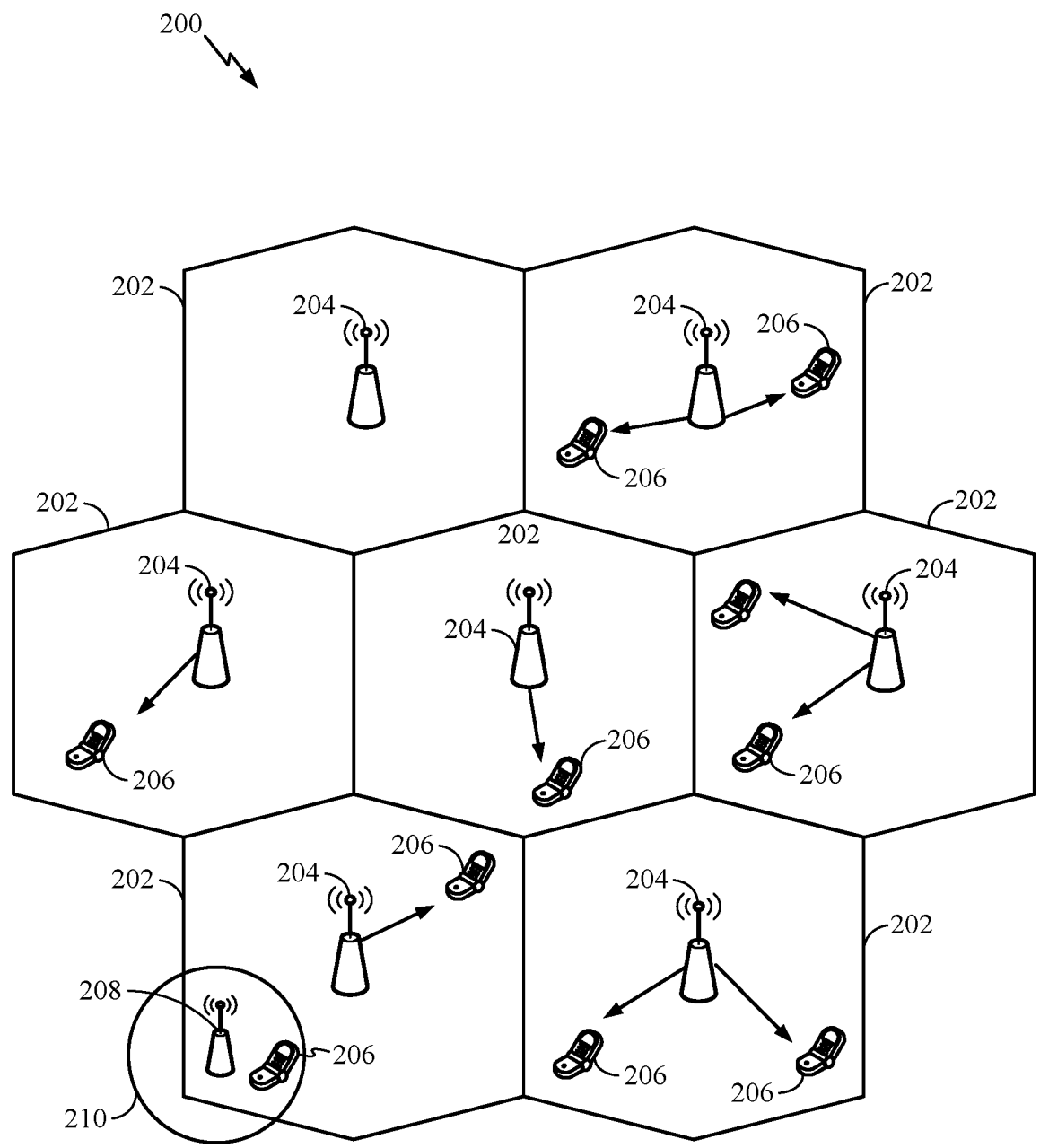
FIG. 2 is a diagram illustrating an example of an access network according to some embodiments.

FIG. 2 is a diagram illustrating an example of an access network 200 in an LTE network architecture in which aspects of the present disclosure may be practiced. For example, eNBs 204 and 208 may be configured to implement techniques for generating synchronization signals, in accordance with aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In various applications (e.g., LTE/5 G/mmWave), OFDM may be used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Figure 3:
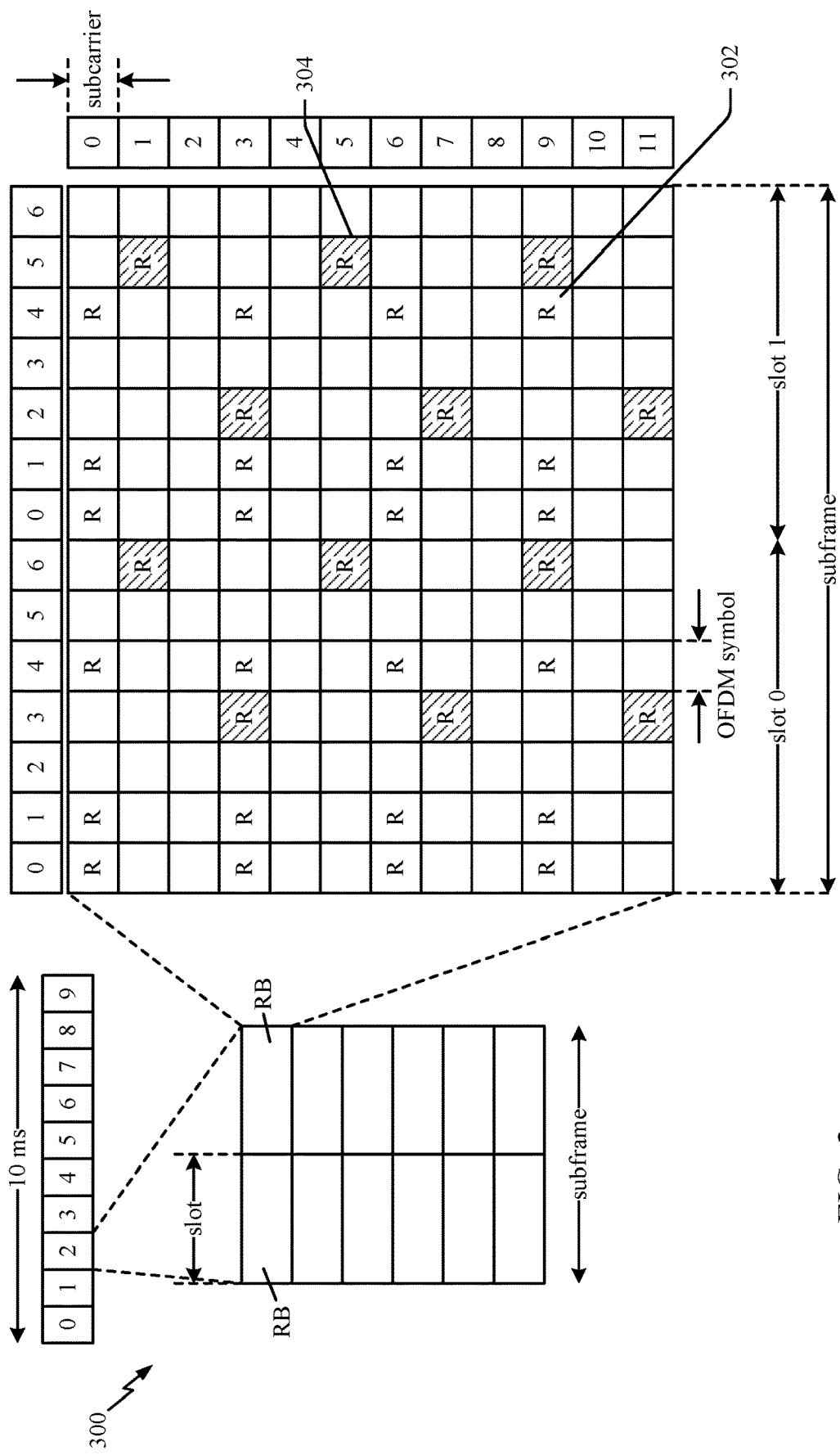
FIG. 3 is a diagram illustrating an example of a DL frame structure in LTE according to some embodiments.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR). FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Since each sub-frame is made up of 2 time slots, and thus 2 resource blocks, each sub-frame includes 14 OFDM symbols. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, in certain aspects, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information. In other wireless systems where this inventions are applied, an eNB may send a primary synchronization signal (PSS) and a secondary synchronization signal (SSS) for each cell in the eNB. The primary and secondary synchronization signals may be sent in plurality of symbol periods (e.g., in symbol periods), in each of synchronization subframe (e.g., subframes 0 and 25 of each radio frame with the normal cyclic prefix). The synchronization signals may be used by UEs for cell detection and acquisition. The eNB may send a Physical Broadcast Channel (PBCH) in plurality of symbol periods of synchronization or other subframes. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
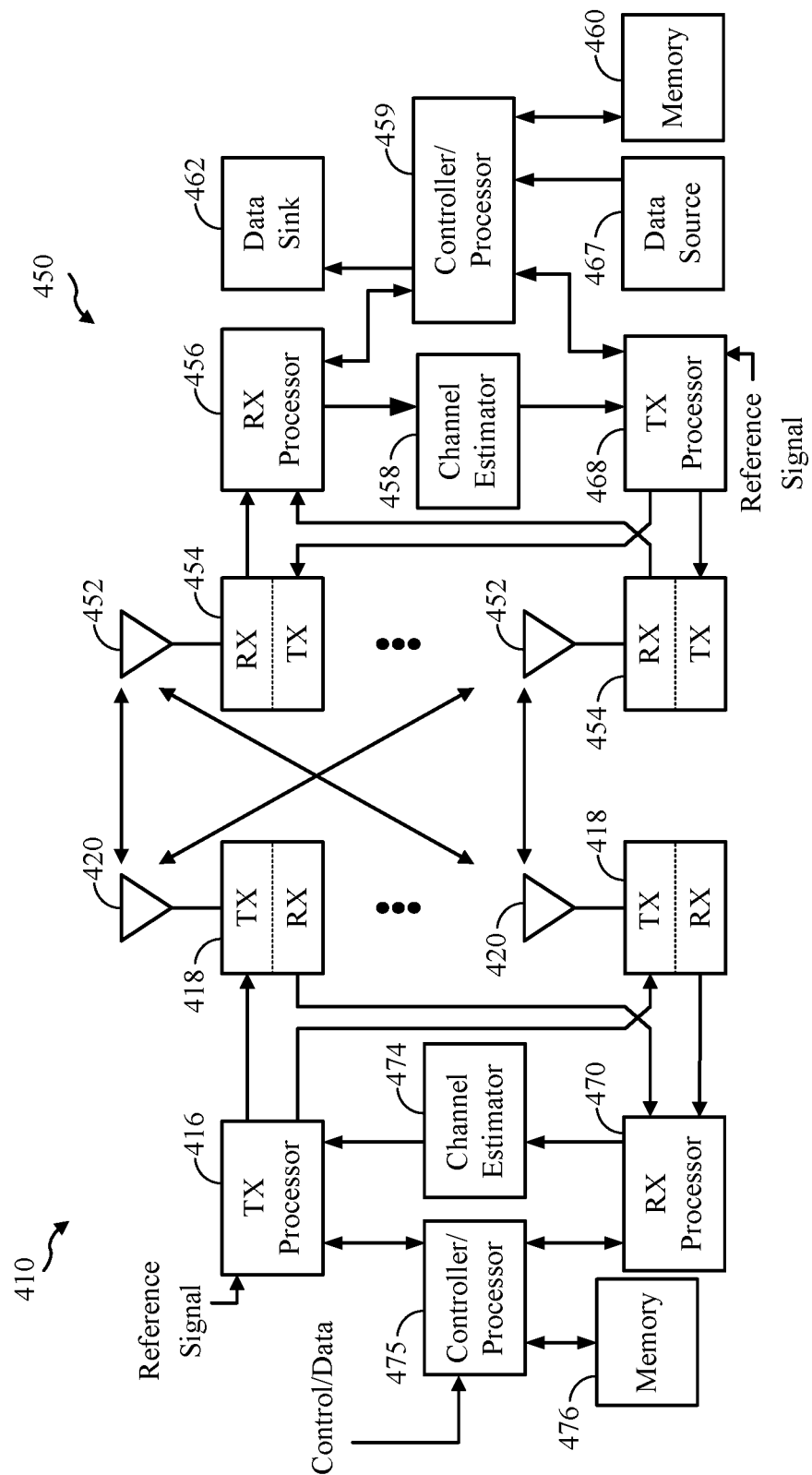
FIG. 4 is a diagram illustrating an example of a base station and user equipment in an access network, in accordance with certain aspects of the disclosure.

FIG. 4 is a block diagram of an eNB 410 in communication with a UE 450 in an access network, in which aspects of the present disclosure may be practiced.

For example, a base station (BS) (e.g., eNB 106) selects an ESS sequence, applies a cyclic shift to the ESS sequence in the frequency domain based on the selected sequence and a symbol index in which the selected ESS sequence is to be transmitted. Further, the BS transmits the ESS sequence in a symbol corresponding to the symbol index to a UE (e.g., UE 102).

A UE (e.g., UE 450), for example, receives the ESS sequence and based on the cyclical shift applied to the ESS sequence determines the symbol index of the symbol in which the ESS sequence was transmitted by the BS. Accordingly, the UE can determine the timing (symbol timing) of the BS to synchronize with the BS.

In the DL, upper layer packets from the core network are provided to a controller/processor 475. The controller/processor 475 implements the functionality of the L2 layer, for example. In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The TX processor 416 implements various signal processing functions for the L1 layer (i.e., physical layer), for example. The signal processing functions includes coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission.

At the UE 450, each receiver 454RX receives a signal through its respective antenna 452. Each receiver 454RX recovers information modulated onto an RF carrier and provides the information to the receiver (RX) processor 456. The RX processor 456 implements various signal processing functions of the L1 layer, for example. The RX processor 456 performs spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 410. These soft decisions may be based on channel estimates computed by the channel estimator 458. The soft decisions are then decoded and deinterleaved to recover the data and control signals that were originally transmitted by the eNB 410 on the physical channel. The data and control signals are then provided to the controller/processor 459.

The controller/processor 459 implements the L2 layer, for example. The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459, for example. The data source 467 represents all protocol layers above the L2 layer, for example. Similar to the functionality described in connection with the DL transmission by the eNB 410, the controller/processor 459 implements the L2 layer for the user plane and the control plane by providing header compression, ciphering, packet segmentation and reordering, and multiplexing between logical and transport channels based on radio resource allocations by the eNB 410, for example. The controller/processor 459 is also responsible for HARQ operations, retransmission of lost packets, and signaling to the eNB 410, for example.

Channel estimates derived by a channel estimator 458 from a reference signal or feedback transmitted by the eNB 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission.

The UL transmission is processed at the eNB 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 may implement the L1 layer, for example.

The controller/processor 475 implements the L2 layer, for example. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the UE 450. Upper layer packets from the controller/processor 475 may be provided to the core network. The controller/processor 475 is also responsible for error detection using an ACK and/or NACK protocol to support HARQ operations. The controllers/processors 475, 459 may direct the operations at the eNB 410 and the UE 450, respectively.

Figure 7:
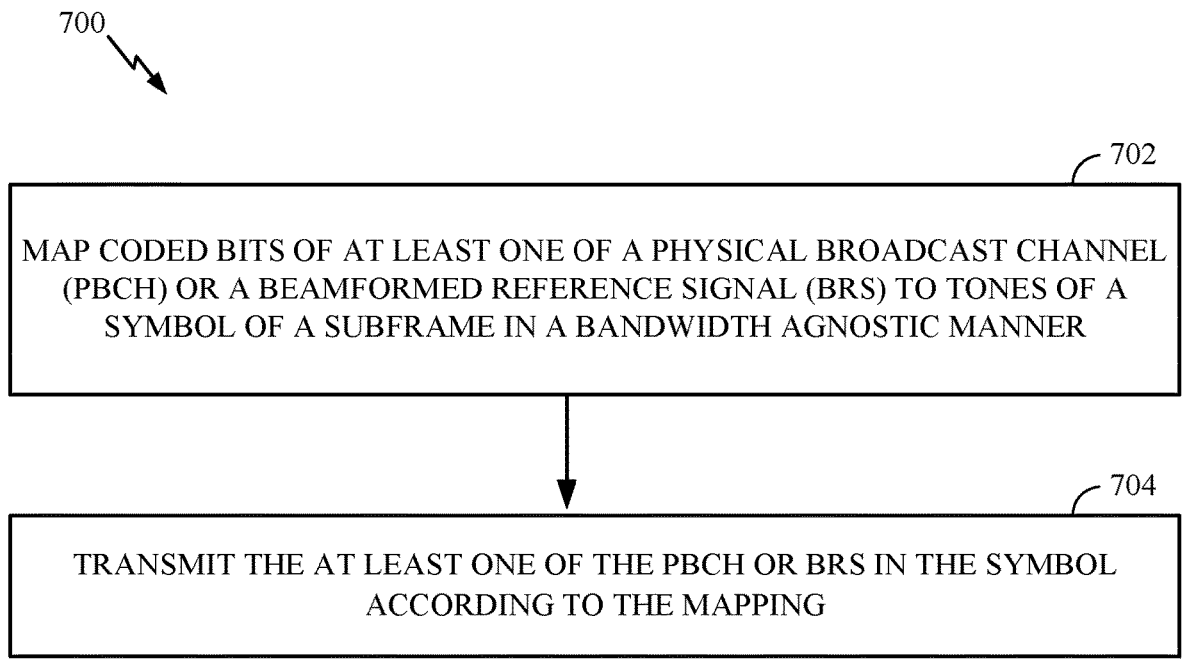
FIG. 7 illustrates example operations for wireless communications by a base station, in accordance with certain aspects of the present disclosure.
Figure 8:
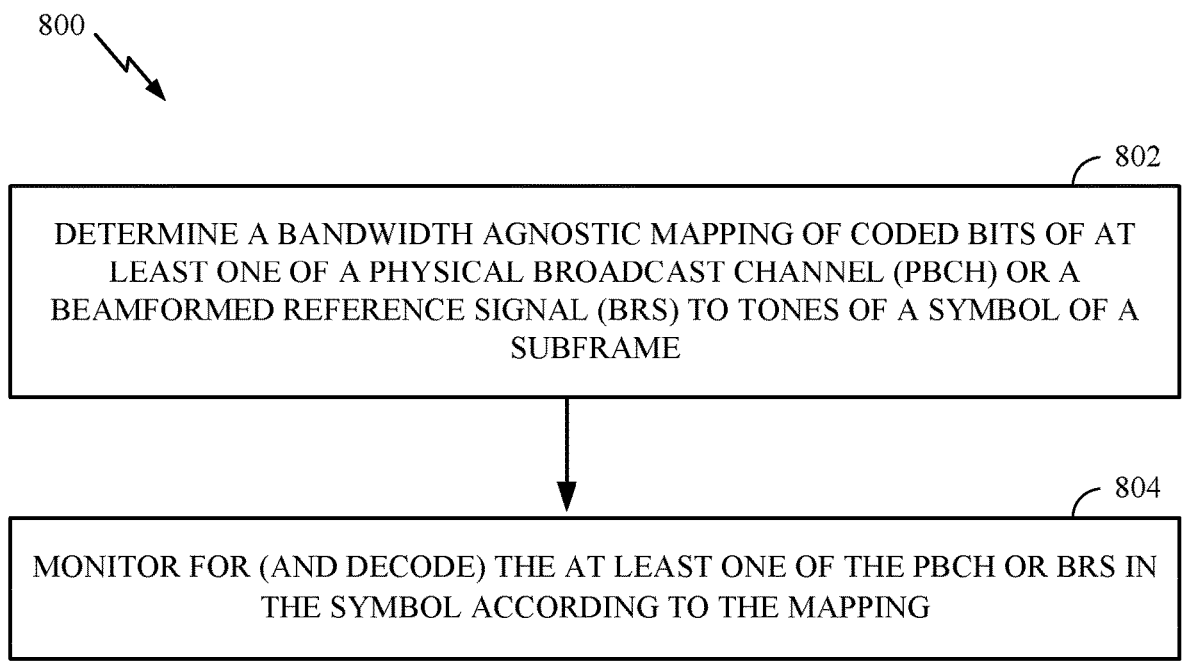
FIG. 8 illustrates example operations for wireless communications by a user equipment, in accordance with certain aspects of the present disclosure.

In certain aspects, one or more of any of the components shown in FIG. 4 may be employed to perform example operations 700 or 800 of FIG. 7 or 8. The memory 460 and 476 may store data and program codes for the UE 450 and eNB 410 respectively, accessible and executable by one or more other components of the UE 450 and the eNB 410.

As discussed above, a BS may generate and send a PSS and SSS for each cell assigned to the BS. A UE in the cell may receive these synchronization signals for cell detection and acquisition, meaning the UE may use these synchronization signals to synchronize with a timing of the BS. For example, as discussed with respect to LTE the PSS and SSS are always transmitted in particular symbol periods (e.g., 6 and 5, respectively) of particular subframes (e.g., 0 and 5) of each frame. The UE receiving such a PSS and SSS can synchronize to the symbol index level in such a system with the BS based on the received PSS and SSS. E.g., the UE can determine when the subframe starts.

Various components described above may be configured to perform operations described below. For example, TX processor 416 and controller/processor 475 may be configured to perform mapping operations described below with reference to FIG. 7, and to transmit signals according to the mapping via receiver transmitter(s) 418. Similarly, RX processor 456 and/or controller/processor 459 may be configured to determine a mapping as described below with reference to FIG. 8, and to monitor for signals transmitted according to the mapping via receiver/transmitter(s) 454.

Example Techniques for Bandwidth Agnostic Tone Mapping

According to aspects of the present disclosure, techniques are provided for mapping coded bits to tones in a bandwidth-agnostic manner. In other words, the mapping may result in coded bits being mapped to a same set of tones regardless of bandwidth. The same set of tones may be common to different available bandwidth configurations. The techniques may be used, for example, to map coded bits of a broadcast channel or a beamformed reference signal (BRS) to tones in symbols of a subframe. As noted above, the mapping may be considered agnostic to system bandwidth, meaning a receiving device may be able to determine the tone locations regardless of the particular actual system bandwidth. This may be advantageous, as a tone mapping that is agnostic to system bandwidth can allow a UE to know what tones to monitor for the broadcast channel before it knows the system bandwidth (which is typically provided in the broadcast channel).

For a UE to perform initial system access, it typically performs a procedure referred to as a cell search to identify a cell ID and/or symbol index of a potential target cell to access. The cell ID is typically identified by detecting primary synchronization signals (PSS) and secondary synchronization signals (SSS) transmitted by the cell base station.

Figure 5:
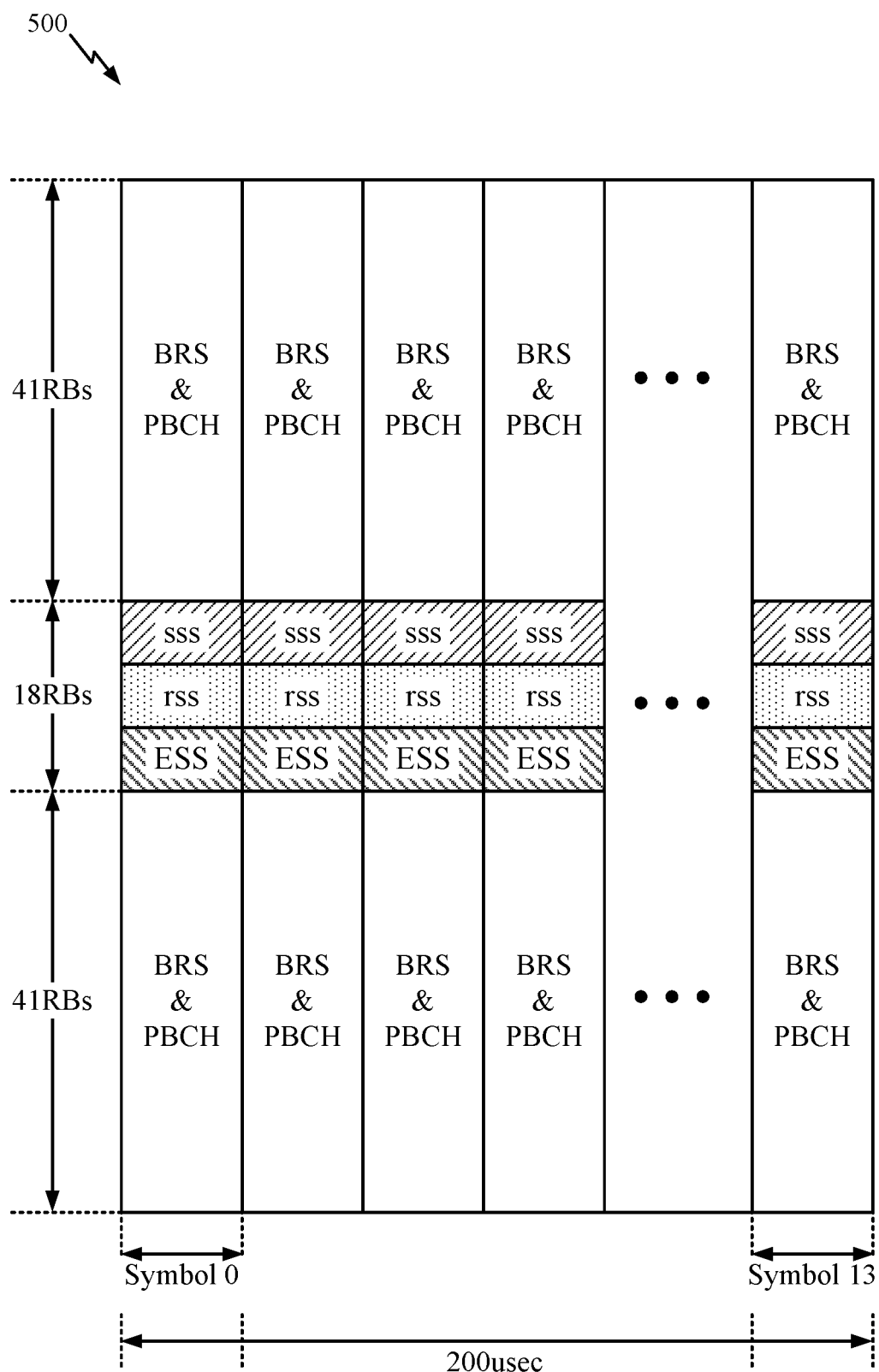
FIG. 5 illustrates an example synchronization subframe, in accordance with certain aspects of the present disclosure.

As illustrated in FIG. 5, extended synchronization signals (ESS) may also be transmitted in each symbol, which may convey additional information. For example, a cyclic shift used in transmitting ESS may convey which symbol the ESS is transmitted in, which may help the UE know the boundaries of the synchronization subframe 500.

As shown in FIG. 5, in some cases, PSS and SSS may be transmitted in each symbol of a synchronization subframe 500. As part of this procedure, a UE decodes a broadcast channel, such as a physical broadcast channel (PBCH), to get additional system information. This additional information may include, for example, a system frame number (SFN), beam index, system bandwidth, and/or a random access channel (RACH) configuration. As noted above, at the cell search state, the UE may not know system bandwidth information (e.g., 80 or 100 MHz or higher tones) and other information (e.g., a number of antenna ports used for beamformed reference signal (BRS) transmission (e.g., 2, 4, or 8 antenna ports).

As illustrated in FIG. 5, PBCH and BRS may also be transmitted in each symbol of the synchronization subframe 500. In some cases, the BRS may be transmitted in ("swept across") different directions in different symbols.

Figure 6A:
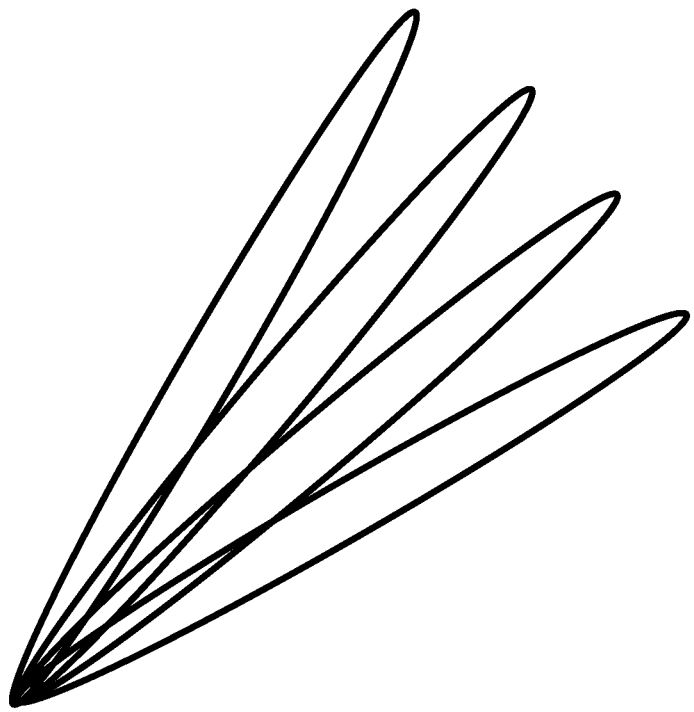
FIGS. 6A and 6B illustrate an example of beams swept across different directions in different symbols, in accordance with certain aspects of the present disclosure.
Figure 6B:
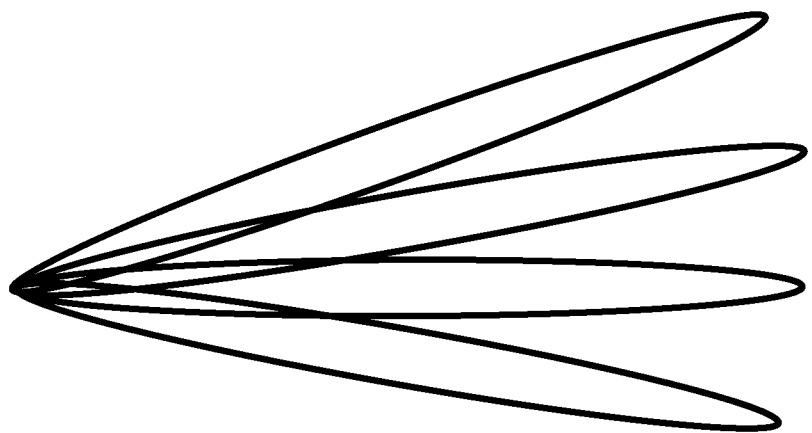

For example, as illustrated in FIG. 6A, in a first symbol, BS sweeps four directions using four ports in a cell specific manner in the first symbol of the synchronization subframe. As illustrated in FIG. 6B, in a second symbol, the BS may sweep four different directions. These directions may be "coarse" beam directions and a UE may provide feedback regarding which of these directions is best (e.g., based on receive signal strength). Further, while beams in FIGS. 6A and 6B are shown as adjacent for the purpose of illustration, in practice, beams transmitted during the same symbol may not actually be adjacent with each other.

BRS may help in determining and addressing issues related to path loss in millimeter wave (MMW) systems due to high carrier frequency and higher non-line-of-sight loss. Higher beamforming gain may be obtained in MMW because the wavelength of MMW band is small, making it possible to pack a higher number of antennas within a fixed array length. In other words, transmissions in MMW may be beamformed, i.e., directional, to mitigate higher path loss. To help select an optimal direction, the BS may transmit BRS by sweeping in all directions so that UE knows the beam ID (and may provide feedback of a corresponding beam ID based on results).

In some cases, it may be beneficial to operate with a smaller band (of overall system bandwidth) for cell search purposes. For example, a UE may search a smaller bandwidth to process its own cell's and neighboring PSS/SSS/ESS for power saving purpose. As another example, a UE may search for asynchronous base station (eNBs) deploying in indoor environment, which may have an impact on which Rx beam/subarray to use.

For certain existing systems, fixed resources may be used for transmitting certain signals. For example, for LTE systems, a center 6 resource blocks (RBs) may be used for PSS/SSS/CRS/PBCH, with additional cell specific reference signals (CRS) transmitted outside the center 6 RBs.

Again referring to FIG. 5, in some cases, PSS/SSS/ESS may be mapped to center RBs (e.g., 3×6 RBs), while BRS/PBCH may be mapped to other RBs. In one case, for example, this mapping may be at 13.5 MHz. In one or more examples, mapping additional BRS/PBCH can be provided in the rest of the RBs. For example, data tones that may be used for PBCH can be around 288 tones for a 100 MHz system. The remaining RBs may be used for BRS and DMRS for PBCH.

In certain cases, tone mapping of coded bits for PBCH may be from lower frequency to higher frequency (e.g., starting at the lowest tone index of system bandwidth to the highest tone index) and rate-matching around center 18 RBs and tones used for BRS and DMRS.

As noted above, however, this approach may present a challenge, as the actual tone locations depend on the actual system. Aspects of the present disclosure, however, provide tone mapping that is agnostic to system bandwidth.

FIG. 7 illustrates example operations 700 for mapping coded bits of downlink transmissions in a manner that may be agnostic to system bandwidth. The operations 700 may be performed, for example, by a base station (BS).

The operations 700 begin, at 702, by mapping a portion of coded bits of at least one of a physical broadcast channel (PBCH) or a beamformed reference signal (BRS) to tones of a symbol of a subframe in a bandwidth agnostic manner. In other words, at least a portion of the coded bits may be mapped to a same set of tones independent of system bandwidth. At 704, the BS transmits the at least one of the PBCH or BRS in the symbol according to the mapping.

FIG. 8 illustrates example operations 800 that may be considered complementary to operations 700 shown in FIG. 7. For example, operations 800 may be performed by a UE, for example, to process a downlink transmissions transmitted by a BS in accordance with operations 700.

The operations 800 begin, at 802, by determining a bandwidth agnostic mapping of coded bits of at least one of a PBCH or BRS to tones of a symbol of a subframe. At 804, the UE monitors for (and decodes) the PBCH or BRS in the symbol according to the mapping.

While certain examples described below and shown in the Figures relate to bandwidth agnostic mapping of bits of a PBCH, those skilled in the art will recognize that the same or similar techniques may be used to map coded bits of other downlink transmissions, such as a BRS, in a bandwidth agnostic manner.

One or more additional aspects may be included in one or more cases. For example, in one or more cases, the coded bits of the PBCH may be mapped to at least one of: tones of the symbol from a first center tone to tones at a lower frequency, or tones of the symbol from a second center tone to tones at a higher frequency. In one or more cases, the mapping of coded bits of the PBCH to tones of the symbol from the first center tone to tones at the lower frequency may be different than the mapping of coded bits of the PBCH to tones of the symbol from the second center tone to tones at the higher frequency. The first and second center tones may define a boundary of a set of tones used for transmitting one or more synchronization signals.

For a first system bandwidth and a second system bandwidth greater than the first bandwidth, the coded bits may be mapped to a commons set of tones, and for the second system bandwidth, a repeated portion of the coded bits may mapped to a set of tones not included in the first bandwidth. In another case, for a first system bandwidth and a second system bandwidth greater than the first bandwidth, the coded bits may be mapped to a commons set of tones, and for the second system bandwidth, additional coded bits are mapped to a set of tones not included in the first bandwidth. The operations may further include transmitting beamformed reference signals (BRS) in tones of the symbol, each BRS transmitted in a different direction. PBCH may be transmitted in every symbol of the synchronization subframe. The base station transmits PBCH in different directions in different symbols of the synchronization subframe.

Figure 9:
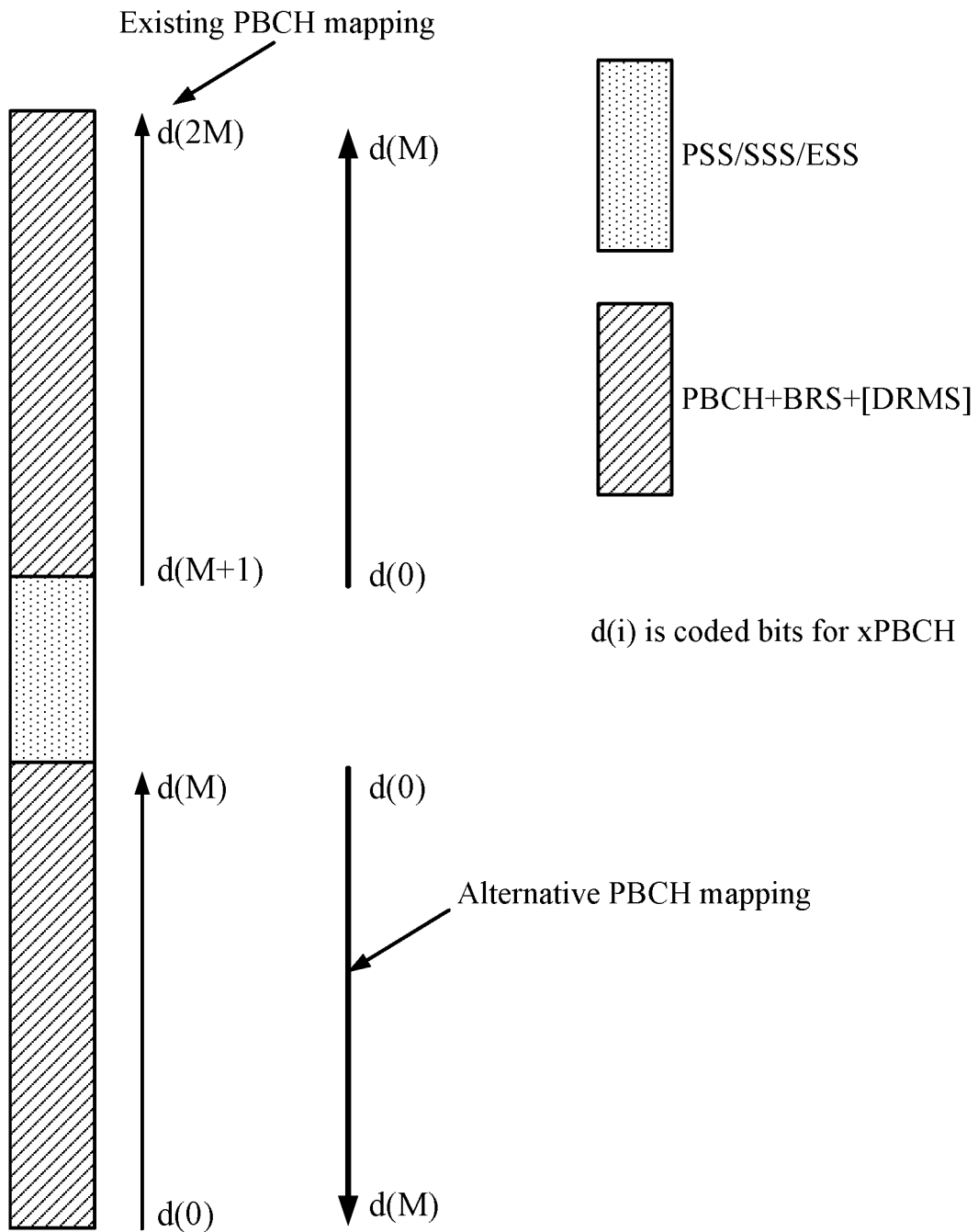
FIG. 9 illustrates an example mapping of coded bits of a broadcast channel to tones in a synchronization subframe symbol, in accordance with certain aspects of the present disclosure.

As illustrated in FIG. 9, in one possible PBCH tone mapping, coded bits of PBCH, d(0) to d(2M) may be mapped from lowest to highest frequency tones of the available system bandwidth. Unfortunately, in this tone mapping procedure, the UE needs to know the exact bandwidth to decode the PBCH signal. In contrast, the bandwidth agnostic tone mapping presented herein may start mapping from the boundaries of the center RBs outward, such that the starting tones (at least) are the same regardless of system bandwidth. In this manner, the tones for coded bit mapping for a first system bandwidth (BW X) may be contained in a second system bandwidth (BW Y, wherein X<Y). As will be described in greater detail below, in some cases, tone mapping for BRS sequences may also be bandwidth agonistic.

As shown in FIG. 9, the coded bits of the PBCH are mapped to tones of the symbol from a first center tone (e.g., a tone at the lower boundary of the center 18 RBs 902) to tones at a lower frequency, to tones of the symbol from a second center tone (e.g., a tone at the upper boundary of the center 18 RBs 902) to tones at a higher frequency, or both. In the example shown in FIG. 9, the same tones d(0)-d(M) are mapped in both directions. In some cases, however, the mapping of coded bits of the PBCH to tones of the symbol from the first center tone to tones at the lower frequency is different than the mapping of coded bits of the PBCH to tones of the symbol from the second center tone to tones at the higher frequency.

In some cases, for a wider bandwidth, a repeated portion of the coded bits are mapped to a set of tones not included in the narrower bandwidth. In this scenario, UEs are able to decode the PBCH signal as long as their bandwidth is greater than or equal to the narrower bandwidth. If UEs have higher bandwidth than the narrower bandwidth, the extra repetitions may provide a better coding rate to those UEs to decode the PBCH signal. As noted above, as an alternative, or in addition, beamformed reference signals (BRS) may also be transmitted using different tones of the symbol (e.g., with each BRS transmitted in a different direction).

In some cases, PBCH may be transmitted in every symbol of the synchronization subframe (e.g., with PBCH transmitted in different directions in different symbols of the synchronization subframe). As an alternative, or in addition, BRS may be transmitted in every symbol of the synchronization symbol (e.g., with BRS transmitted in different directions in different symbols of the synchronization subframe). In some cases, BRS sequences may be mapped per resource block (RB), for example, with each RB occupying a fixed number of tones (e.g., 12) and the sequence can be repeated throughout the entire component carrier, where each component carrier contains a fixed number of RBs (e.g. 100)

Using the mapping presented herein, even when system bandwidth for a carrier is unknown, the UE may know what tones to monitor for BRS sequences, and what tones to monitor for coded bits for PBCH and PBCH. As a result, the mapping proposed herein may help enable operation in a narrower bandwidth (relative to system bandwidth for a carrier) and data path to decode PBCH and BRS measurement.

One or more additional aspects may be included in one or more cases. For example, in one or more cases, the sequence of bits of the BRS may be mapped to at least one of: tones of the symbol from a first center tone to tones at a lower frequency, or tones of the symbol from a second center tone to tones at a higher frequency. In one or more cases, the mapping of the sequence of bits of the BRS to tones of the symbol from the first center tone to tones at the lower frequency may be different than the mapping of the sequence of bits of the BRS to tones of the symbol from the second center tone to tones at the higher frequency. The first and second center tones may define a boundary of a set of tones used for transmitting one or more synchronization signals.

For a first system bandwidth and a second system bandwidth greater than the first bandwidth, the sequence of bits of the BRS signal may be mapped to a common set of tones. For the second system bandwidth, a repeated portion of the sequence of bits of the BRS signal may be mapped to a set of tones not included in the first bandwidth. In one or more cases. The sequence of bits of BRS may be mapped per resource block (RB), each RB occupying a fixed number of tones. In one example, the fixed number of tones may be 12. In one or more cases, BRS may be transmitted in every symbol of the subframe. The base station may transmit BRS in different directions in different symbols of the subframe. In one or more examples, the operations may include decoding the BRS according to the determination.

Code Offset Across Multiple Sub-Frame

In some cases, coded bits of a broadcast channel, such as PBCH may be transmitted using resources across multiple sub-frames. For example, in some cases, PBCH payload may include 40 uncoded bits (e.g., 8 bit of system frame number, 16 bits of CRC, and 16 spare bits). In some cases, the spare bits may be used, for example, to transmit various information, such as a number of PCFICH symbols, system bandwidth, or the like. For a mm-wave system, such spare bits may be used to transmit system bandwidth, beam reference signal duration period, or system bandwidth.

Using resources across multiple subframes, a different (redundancy) version of the same coded bits may be sent. For example, every 10 ms the coded bits may be sent as a different redundancy version. Assuming a repetition value of 4, a new set of 40 uncoded bits may be transmitted after every 40 ms. As noted above, PBCH may include 8 bits of system frame number (SFN) and two additional bits may be used to convey a redundancy version. For example, these other 2 bits may come from transmitting different redundancy versions at different 10 ms duration. In this case, 8-bits of a 10-bit SFN field may be used to convey one of four different redundancy versions during 40 ms.

In this manner, an uncoded PBCH may be transformed into a set of coded bits, in the "bandwidth agnostic" manner described above. This set of coded bits may then get repeated a sufficient number of times for rate matching (e.g., repeated every 10 ms four times total). In this case, TBCC ⅓ coding could be used, such that 40 uncoded bits gets transformed to 120 coded bits. The rate matched and multiple repetitions of the coded bits may then get mapped to the region, for example, through QPSK modulation.

Figure 10:
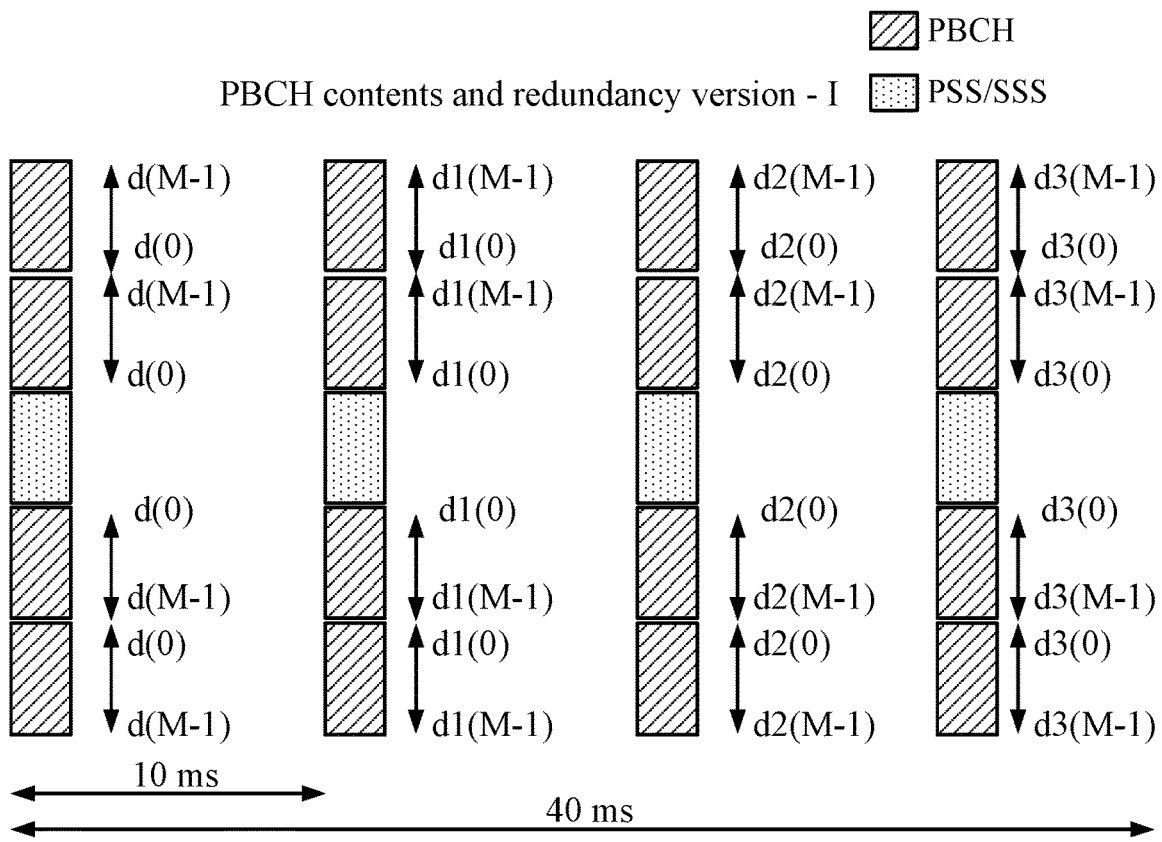
FIG. 10 illustrates an example mapping of coded bits of a broadcast channel to resources across multiple subframes, in accordance with certain aspects of the present disclosure.

FIG. 10 illustrates one example of transmitting redundant versions of PBCH using bandwidth agnostic mapping to resources across 4 different subframes. As illustrated, a different redundancy version (of the same PBCH payload) is sent every 10 ms. In the example, the four different redundancy versions are labeled d, d1, d2, and d3, with each having coded bits 0 to M−1.

Figure 11:
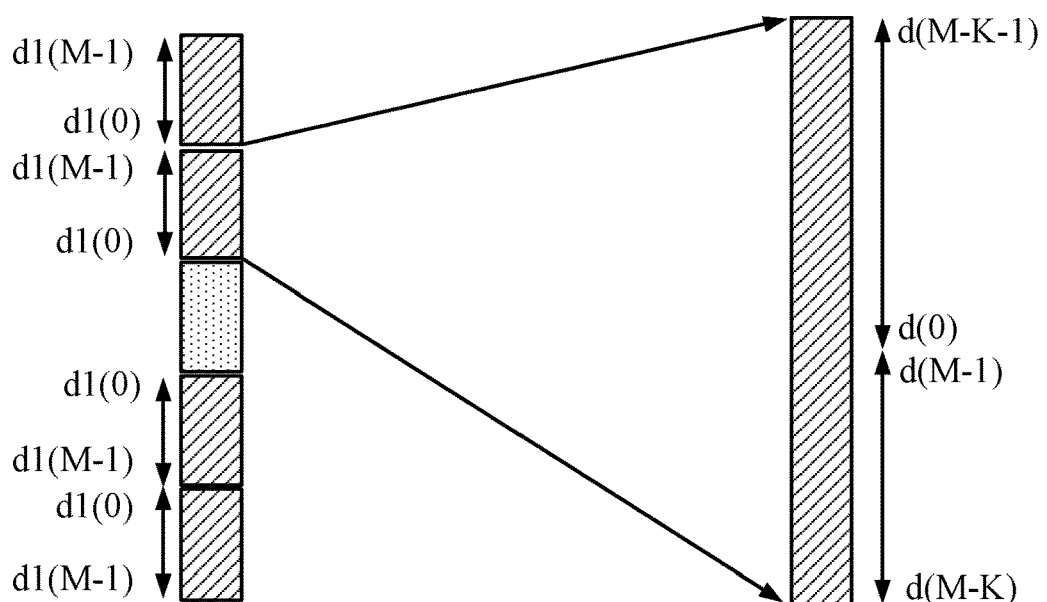
FIGS. 11-13 illustrate relationships of bit mappings between different redundancy versions shown in FIG. 10.
Figure 12:
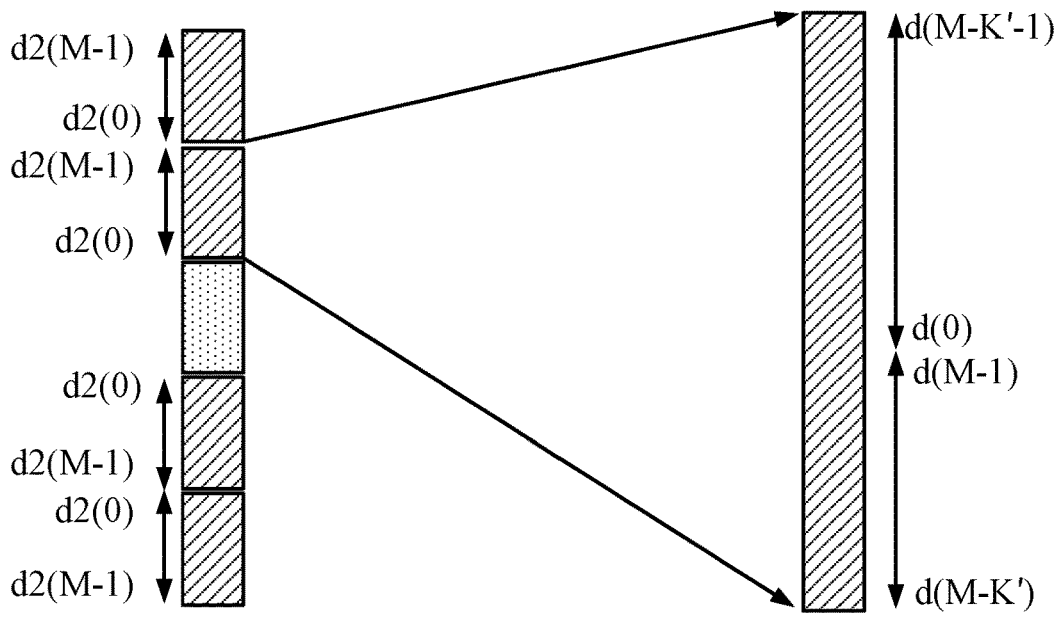
Figure 13:
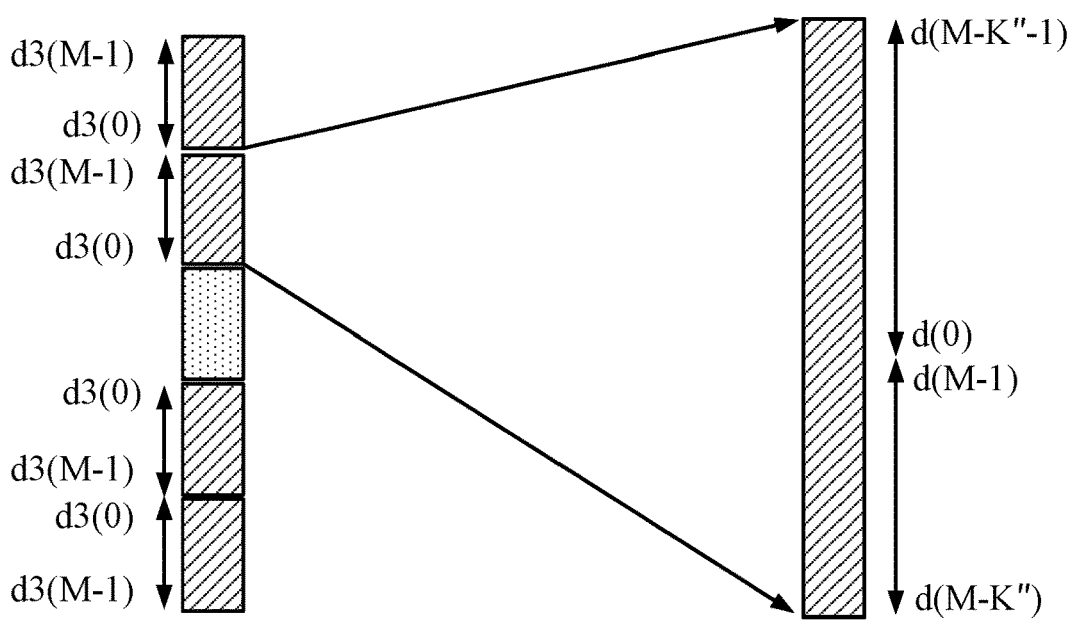

FIGS. 11, 12, and 13 illustrate how the redundancy versions may be related. For example, FIG. 11 illustrates how bit mapping of redundancy version d1 may relate to the bit mapping of d. As shown in FIG. 11, redundancy version d1 is offset by a value K. Similarly, FIGS. 12 and 13 illustrate how bit mappings of redundancy versions (RVs) d2 and d3, respectively, relate to the bit mapping of d. In FIG. 12 the redundancy version d2 is shown offset by a value K', while in FIG. 13 redundancy version d3 is shown being offset by a value K".

One or more additional aspects may be included in one or more cases. For example, in one or more cases, coded bits of the PBCH may be mapped over a fixed number of resources across multiple subframes. The fixed number of resources may include a maximum allowed number of resources over one period of transmission. The maximum allowed number of resources may be determined by a maximum component carrier bandwidth. The maximum allowed number of resources can also, in part or in whole, be based on a predefined value. The mapping may include mapping coded bits of one period of PBCH transmission to a plurality of segments. In one or more examples, for each segment, coded bits of that segment may be mapped to a fixed starting offset regardless of available resource for the transmission. The fixed number of subframe resources may be dependent on at least one of system bandwidth or allowed bandwidth used for transmitting the PBCH.

According to one or more cases, first and second center tones may be adjacent to each other such that there may not be any gap between the first and second center tone that accommodate PSS, SSS, and ESS. Further, according to one or more aspects, synchronization signals and PBCH may be time division multiplexed.

Figure 14:
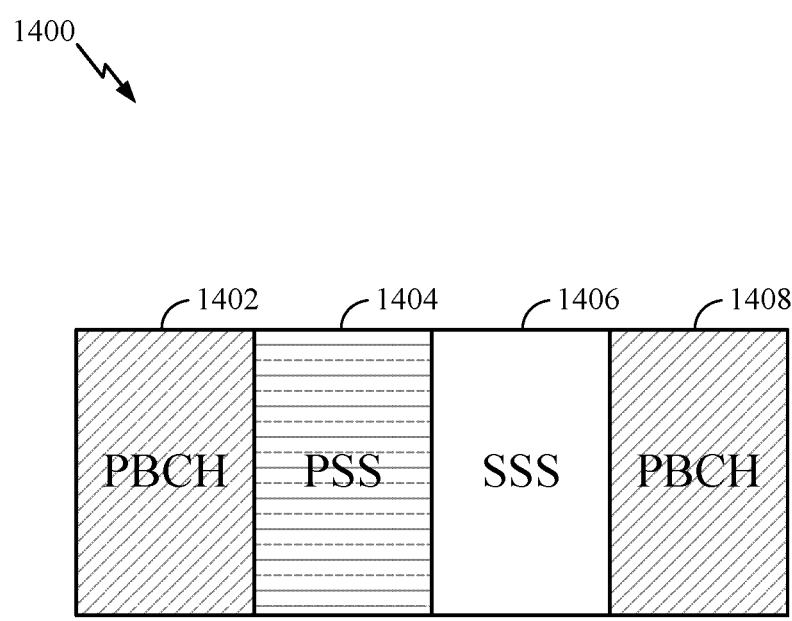
FIG. 14 illustrates an example unified new radio (NR) synchronization signal block design, in accordance with certain aspects of the present disclosure.

For example, FIG. 14 illustrates an example unified NR synchronization signal block design, in accordance with certain aspects of the present disclosure. As shown synchronization signals and the physical broadcast channel (PBCH) may be time-division multiplexed (TDM). In particular, the multiplexing ordering may be PBCH 1402, PSS 1404, SSS 1406, and PBCH 1408. Furthermore, the two PBCH symbols 1402 and 1408 within a SS block may be identical.

In one or more cases as shown in FIG. 14 a synchronization signal block may consist of one OFDM symbol for PSS 1404 and one OFDM symbol for SSS 1406. Furthermore, the synchronization signal block may contain two OFDM symbols for PBCH 1402 and 1408 which may be identical: one PBCH symbol 1402 in the beginning of SS block and the other 1408 in the end of SS block. Such two identical PBCH symbols 1402 and 1408, which are separated by PSS 1404 and SSS 1406, may allow a UE to refine the carrier frequency offset (CFO) estimation. More specifically, the UE may coarsely estimate the CFO based on synchronization signals and further refine the estimate by two looks of PBCH without decoding PBCH.

One benefit of the TDM design is that the SSS may be used as the reference for channel estimation of the PBCH symbols. In order to provide this benefit, the SSS is transmitted from the same antenna ports as PBCH. According to one or more cases, the specific TDM design may consists of 2 PBCH symbols transmitted at the beginning and the end of a SS block. Further the signal transmitted within these two sub-symbols may be the same (e.g. same redundancy version). This repeating structure may be used to provide a finer frequency offset estimation, without the UE having to decode PBCH first. Note that in some scenarios even better estimation can be achieved (especially at low SNR) after successful PBCH decoding, if the UE uses regenerated PBCH symbols.

Given this information, a UE may attempt to decode PBCH using different redundancy versions at different durations of 10 ms. The UE may then perform coherent combining after de-offsetting each different RVs. The UE may also know the 40 ms boundary (e.g., after at most observing for 70 ms duration) and after decoding PBCH transmitted during four subsequent 10 ms durations that contain the same 8 bit SFN. In other words, a change in SFN indicates a new set of coded bits for PBCH. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 7-8 and 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a base station, comprising:
   mapping at least one of a physical broadcast channel (PBCH) or a beamformed reference signal (BRS) to tones of a symbol of a subframe, wherein the mapping is independent of system bandwidth, and wherein the mapping comprises:
      mapping coded bits of one period of PBCH transmission to a plurality of segments; and
      for each segment, mapping coded bits of that segment to a fixed starting offset regardless of available resource for the transmission; and
   transmitting the at least one of the PBCH or BRS in the symbol according to the mapping.

2. The method of claim 1, wherein the mapping comprises:
   mapping tones of the symbol from a first center tone to tones at a lower frequency; and
   mapping tones of the symbol from a second center tone to tones at a higher frequency.

3. The method of claim 2, wherein the first and second center tones define a boundary of a set of tones used for transmitting one or more synchronization signals.

4. The method of claim 1, wherein the mapping comprises:
   mapping coded bits of the PBCH or BRS to a common set of tones for a first system bandwidth and a second system bandwidth greater than the first bandwidth; and
   mapping, for the second system bandwidth, repeated coded bits or additional coded bits to a set of tones not included in the first bandwidth.

5. The method of claim 1, wherein each BRS is transmitted in a different direction.

6. The method of claim 1, wherein the at least one of the PBCH or BRS is transmitted in every symbol of the subframe.

7. The method of claim 6, wherein the base station transmits the at least one of the PBCH or BRS in different directions in different symbols of the subframe.

8. The method of claim 1, wherein the at least one of the PBCH or BRS is mapped over a fixed number of resources across multiple subframes.

9. The method of claim 1, wherein:
   the mapping comprises mapping coded bits of a BRS to tones of a symbol of the subframe; and
   the sequence of bits of BRS are mapped per resource block (RB), each RB occupying a fixed number of tones.

10. A method of wireless communications by a user equipment, comprising:
    determining a mapping of coded bits of at least one of a physical broadcast channel (PBCH) or a beamformed reference signals (BRS) to tones of a symbol of a subframe, wherein the mapping is independent of system bandwidth, and wherein the mapping comprises:
       mapping coded bits of one period of PBCH transmission to a plurality of segments; and
       for each segment, mapping coded bits of that segment to a fixed starting offset regardless of available resource for the transmission; and
    monitoring for the at least one of the PBCH or BRS in the symbol according to the mapping.

11. The method of claim 10, wherein the mapping comprises:
a mapping of tones of the symbol from a first center tone to tones at a lower frequency; and
a mapping of tones of the symbol from a second center tone to tones at a higher frequency.

12. The method of claim 11, wherein the first and second center tones define a boundary of a set of tones used for transmitting one or more synchronization signals.

13. The method of claim 10, wherein the mapping comprises:
a mapping of the coded bits to a common set of tones for a first system bandwidth and a second system bandwidth greater than the first bandwidth; and
a mapping, for the second system bandwidth, of a repeated portion of the coded bits or additional coded bits to a set of tones not included in the first bandwidth.

14. The method of claim 10, wherein:
the mapping comprises a mapping of the coded bits of the PBCH to tones of the symbol of the subframe; and
the method further comprises monitoring for BRS in tones of the symbol.

15. The method of claim 10, wherein the at least one of the PBCH or BRS is monitored for in every symbol of the subframe.

16. The method of claim 10, wherein the coded bits of the at least one of the PBCH or BRS is mapped over a fixed number of resources across multiple subframes.

17. The method of claim 10, wherein:
the mapping comprises a mapping of the coded bits of the BRS to tones of a symbol of the subframe; and
the coded bits of the BRS is mapped per resource block (RB), each RB occupying a fixed number of tones.

18. An apparatus for wireless communications by a base station, comprising:
means for mapping at least one of a physical broadcast channel (PBCH) or a beamformed reference signal (BRS) to tones of a symbol of a subframe, wherein the mapping is independent of system bandwidth, and wherein the mapping comprises:
mapping coded bits of one period of PBCH transmission to a plurality of segments; and
for each segment, mapping coded bits of that segment to a fixed starting offset regardless of available resource for the transmission; and
means for transmitting the at least one of the PBCH or BRS in the symbol according to the mapping.

19. An apparatus for wireless communications by a user equipment, comprising:
means for determining a mapping of coded bits of at least one of a physical broadcast channel (PBCH) or a beamformed reference signals (BRS) to tones of a symbol of a subframe, wherein the mapping is independent of system bandwidth, and wherein the mapping comprises:
mapping coded bits of one period of PBCH transmission to a plurality of segments; and
for each segment, mapping coded bits of that segment to a fixed starting offset regardless of available resource for the transmission; and
means for monitoring for the at least one of the PBCH or BRS in the symbol according to the mapping.

20. An apparatus for wireless communications by a base station, comprising:
at least one processor configured to map at least one of a physical broadcast channel (PBCH) or a beamformed reference signal (BRS) to tones of a symbol of a subframe, wherein the mapping is independent of system bandwidth, and wherein the mapping comprises:
mapping coded bits of one period of PBCH transmission to a plurality of segments; and
for each segment, mapping coded bits of that segment to a fixed starting offset regardless of available resource for the transmission;
a transmitter configured to transmit the at least one of the PBCH or BRS in the symbol according to the mapping; and
a memory coupled with the at least one processor.

21. An apparatus for wireless communications by a user equipment, comprising:
at least one processor configured to determine a mapping of coded bits of at least one of a physical broadcast channel (PBCH) or a beamformed reference signals (BRS) to tones of a symbol of a subframe independent of system bandwidth, and wherein the mapping comprises:
mapping coded bits of one period of PBCH transmission to a plurality of segments; and
for each segment, mapping coded bits of that segment to a fixed starting offset regardless of available resource for the transmission;
a receiver configured to monitor for the at least one of the PBCH or BRS in the symbol according to the mapping; and
a memory coupled with the at least one processor.

22. A non-transitory computer readable medium for wireless communication by a base station having instructions stored thereon for:
mapping at least one of a physical broadcast channel (PBCH) or a beamformed reference signal (BRS) to tones of a symbol of a subframe, wherein the mapping is independent of system bandwidth, and wherein the mapping comprises:
mapping coded bits of one period of PBCH transmission to a plurality of segments; and
for each segment, mapping coded bits of that segment to a fixed starting offset regardless of available resource for the transmission; and
transmitting the at least one of the PBCH or BRS in the symbol according to the mapping.

23. A non-transitory computer readable medium for wireless communication by a user equipment having instructions stored thereon for:
determining a mapping of coded bits of at least one of a physical broadcast channel (PBCH) or a beamformed reference signals (BRS) to tones of a symbol of a subframe, wherein the mapping is independent of system bandwidth, and wherein the mapping comprises:
mapping coded bits of one period of PBCH transmission to a plurality of segments; and
for each segment, mapping coded bits of that segment to a fixed starting offset regardless of available resource for the transmission; and
monitoring for the at least one of the PBCH or BRS in the symbol according to the mapping.

\* \* \* \* \*